United States Patent
Bradley et al.

(10) Patent No.: US 11,256,453 B1
(45) Date of Patent: Feb. 22, 2022

(54) RETARGETING EVENTS SERVICE FOR ONLINE ADVERTISING

(71) Applicant: Amazon Technologies, Inc., Seattle, WA (US)

(72) Inventors: Andrew J. Bradley, Edinburgh (GB); Andrew Craig Brind, Edinburgh (GB); Anthony Richard McBryan, Glasglow (GB); Sebastiano Merlino, Edinburgh (GB); Sean Daniel Murphy, Edinburgh (GB); Alistair Francis Smith, Edinburgh (GB); David Neil Turner, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/169,612

(22) Filed: Feb. 8, 2021

Related U.S. Application Data

(63) Continuation of application No. 16/737,730, filed on Jan. 8, 2020, now Pat. No. 10,936,258, which is a continuation of application No. 14/747,451, filed on Jun. 23, 2015, now Pat. No. 10,559,001.

(51) Int. Cl.
| | | |
|---|---|---|
| *G06F 3/12* | (2006.01) | |
| *G06Q 30/02* | (2012.01) | |
| *G06Q 10/06* | (2012.01) | |

(52) U.S. Cl.
CPC .......... *G06F 3/1222* (2013.01); *G06F 3/1238* (2013.01); *G06F 3/1285* (2013.01); *G06Q 10/06* (2013.01); *G06Q 30/0243* (2013.01); *G06Q 30/0269* (2013.01); *G06Q 30/0275* (2013.01)

(58) Field of Classification Search
CPC .... G06F 3/1222; G06F 3/1285; G06F 3/1238; G06Q 10/06; G06Q 30/0243; G06Q 30/0269; G06Q 30/0275
USPC ........................................................ 358/1.14
See application file for complete search history.

(56) References Cited

U.S. PATENT DOCUMENTS

| | | | |
|---|---|---|---|
| 8,386,639 B1 | 2/2013 | Galvin | |
| 10,467,653 B1* | 11/2019 | Avedissian | ....... H04N 21/41415 |
| 10,559,001 B1 | 2/2020 | Bradley et al. | |
| 2003/0208390 A1 | 11/2003 | Posner | |
| 2005/0097204 A1 | 5/2005 | Horowitz | |

(Continued)

*Primary Examiner* — Allen H Nguyen
(74) *Attorney, Agent, or Firm* — Eversheds Sutherland (US) LLP

(57) ABSTRACT

This disclosure describes systems, methods, and computer-readable media related to retargeting online advertisement campaign recommendations for advertisements with multiple items or services. Bids may be based on a combined advertisement creative comprising two or more items or services. Dynamically selecting multiple items at bid time using a retargeting model to determine a potential revenue generation amount associated with an event may increase the probability of a conversion event based on the creative that includes the selected items. In some embodiments, a machine-learned retargeting model may be used to select multiple items to be displayed in an advertisement. The retargeting model may be applied to items that were previously viewed by the consumer and may determine a value for each of the items using factors. A bid may be calculated for each of the selected items using the values determined by the retargeting model.

20 Claims, 5 Drawing Sheets

(56) References Cited

U.S. PATENT DOCUMENTS

| | | |
|---|---|---|
| 2005/0165643 A1* | 7/2005 | Wilson ............... G06Q 30/0241 |
| | | 705/14.53 |
| 2007/0055554 A1 | 3/2007 | Sussman et al. |
| 2008/0052219 A1 | 2/2008 | Sandholm et al. |
| 2010/0251290 A1 | 9/2010 | Kodialam et al. |
| 2010/0257054 A1 | 10/2010 | Martin et al. |
| 2010/0257058 A1 | 10/2010 | Karidi et al. |
| 2011/0016014 A1 | 1/2011 | Tonnison et al. |
| 2011/0258049 A1 | 10/2011 | Ramer et al. |
| 2013/0060601 A1 | 3/2013 | Kodialam et al. |
| 2013/0073387 A1 | 3/2013 | Heath |
| 2013/0073473 A1 | 3/2013 | Heath |
| 2014/0025509 A1 | 1/2014 | Reisz et al. |
| 2014/0046777 A1 | 2/2014 | Markey et al. |
| 2014/0100943 A1 | 4/2014 | Palihapitiya et al. |
| 2014/0213238 A1 | 7/2014 | Giraud et al. |
| 2014/0351046 A1 | 11/2014 | Carlyle et al. |
| 2014/0365317 A1 | 12/2014 | Goel et al. |
| 2015/0039418 A1 | 2/2015 | Baluja et al. |
| 2015/0106191 A1 | 4/2015 | Ge et al. |
| 2015/0128162 A1 | 5/2015 | Ionescu |
| 2015/0332314 A1 | 11/2015 | Chakraborty et al. |
| 2016/0189207 A1* | 6/2016 | Xu ..................... G06Q 30/0249 |
| | | 705/14.48 |
| 2017/0169465 A1* | 6/2017 | Capel ................. G06Q 30/0275 |
| 2018/0330405 A1 | 11/2018 | Ashiru et al. |

* cited by examiner

RETARGETING EVENTS SERVICE FOR ONLINE ADVERTISING

CROSS-REFERENCE TO RELATED APPLICATION(S)

This application is a continuation of U.S. Nonprovisional application Ser. No. 16/737,730 filed Jan. 8, 2020, which is a continuation of U.S. Nonprovisional application Ser. No. 14/747,541, filed Jun. 23, 2015, each of which is incorporated by reference in its entirety.

BACKGROUND

Online advertising is the delivery of promotional marketing messages to consumers over the Internet. Examples of online advertising may include email marketing, search engine marketing, social media marketing, many types of display advertising, and mobile advertising. Personalized retargeting (also known as retargeting) is a form of online targeted advertising by which online advertising is targeted based on the previous actions of a consumer, which may include actions that led to a sale or conversion as well as those actions that did not. In many instances, online advertising campaigns utilize upselling techniques where advertisements are directed to more expensive items rather than items that are tailored for the consumer and their preferences.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
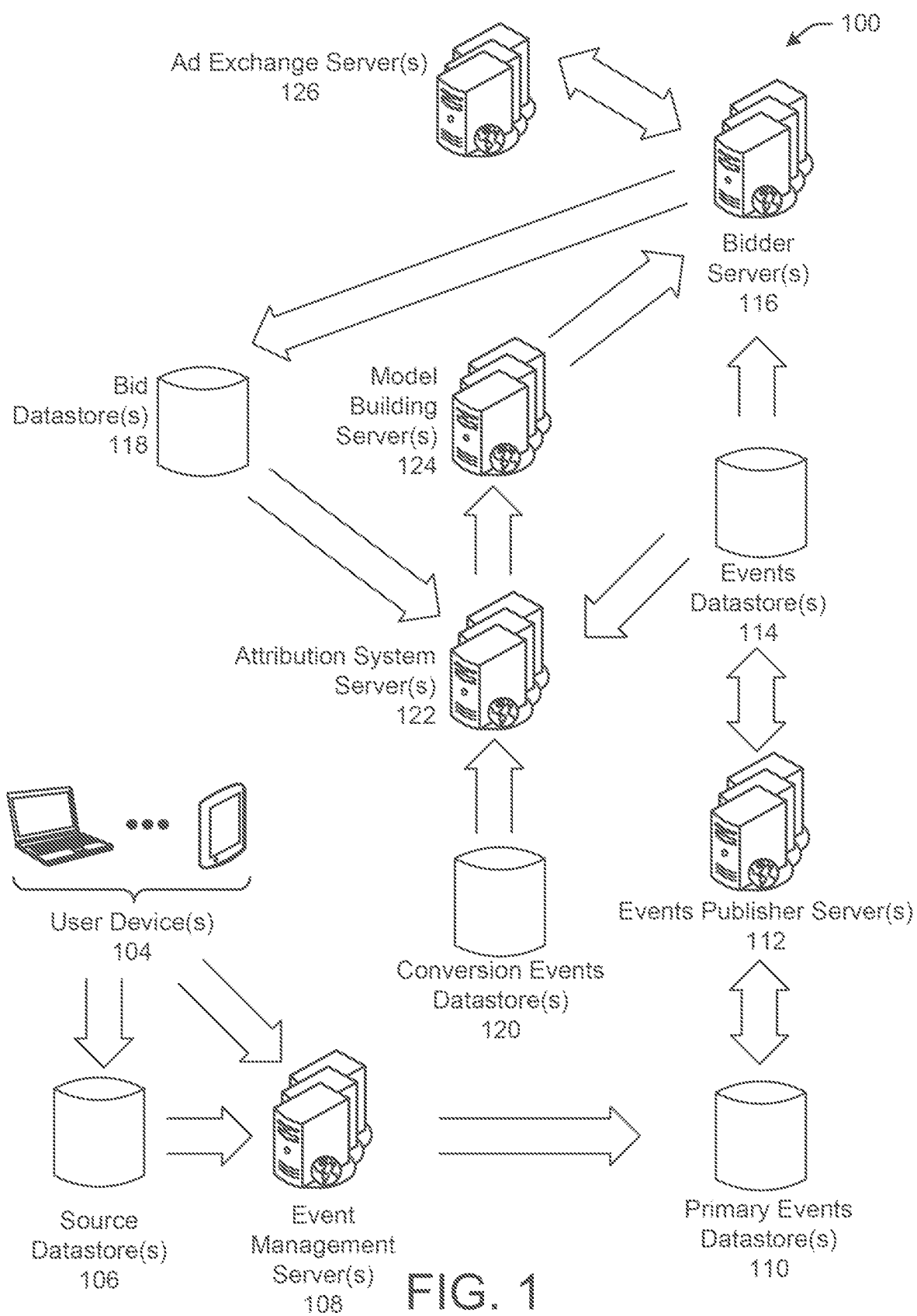
FIG. 1 depicts an illustrative data flow between various components of an illustrative system architecture for bid time data service for retargeting events for an online advertising campaigns in accordance with one or more embodiments of the disclosure.

This disclosure relates to, among other things, systems, methods, computer-readable media, techniques, and methodologies for bid time data service for retargeting events for online advertisement campaign. Retargeting advertising is a form of online targeted advertising by which online advertising is targeted based on the previous actions of a consumer, which may include actions that led to a sale or conversion as well as those actions that did not. In some instances, advertisements that combine multiple items in an advertisement may be more effective than displaying a single item in an advertisement. For example, rather than just displaying an advertisement for a book, an advertisement that displays both a book and a movie may have an increased impact on a consumer, which may lead to a higher conversion rate.

The systems and methods described herein may increase the scale and efficiency of retargeted events for online advertising campaigns by generating advertisements with multiple items or services. Real-time bids for online advertising slots may be based on a combined advertising creative comprising one or more items or services. Some systems provide retargeted advertisements by merely choosing the most expensive item available in an attempt to upsell the consumer on a product. Dynamically selecting multiple items at bid time using a retargeting model to determine a potential revenue generation amount associated with an event may increase the probability of a conversion event based on the creative that includes the selected items. Previously, such calculations may have occurred offline and asynchronously, which would not be tenable in a system for real-time bidding. In some embodiments, a machine-learned retargeting model may be used to select one or multiple items to be displayed in an advertisement. The retargeting model may be applied to items that were previously viewed by the consumer and may determine a value for each of the items using factors which may include, but are not limited to, an events index in the consumers activity history, the number of times the consumer viewed the item, the price of the item, the number of prior impressions of the item, the conversion rate of the item for the website on which the advertisement will be displayed, and how recently the item was viewed by the consumer. A bid may be generated for the selected items using the values determined by the retargeting model for each of the items.

In some embodiments, items may be selected on the basis of values generated by the machine-learned retargeting model. Such values may include, but are not limited to, total expected revenue from the item, total expected revenue multiplied by an allowable value (e.g., allowable may be a fraction which can vary from item to item and chosen to reflect the strategic value or profit margin of the item, total expected contribution profit, expected downstream impact or any other value that may reflect an objection which addresses business needs. In some models, the price of an item may be removed before determining a value to avoid the user being "upsold" or selecting items because they are more expensive. In some embodiments, the model may be applied to the identified events and the events may be ranked based on their respective values generated by the model.

In some embodiments, the selection of multiple items to display in an advertisement may also lead to selection of a layout for the creative of the advertisement. Based on the number of items selected, layout, color scheme, inclusion of a price, etc., may be selected to complement the selected items.

Asynchronously, but in parallel, events may be generated on different user devices, which may include smartphones, laptops, tablets, wearable computing devices, set-to-boxes, televisions, and the like. Events may be data obtained from user devices, such a laptops or smartphones that is indicative of user interaction with a website during a user session. Events may be transmitted to a server, which may store the raw data events in a datastore. The raw data events may be stored in log files. In some embodiments, the events may be transmitted from the user devices to an event management server.

An event management server may obtain and/or receive events data from one or more sources, which may include user devices, servers, and/or datastores. The event management server may process the received events. For example, the event management server may normalize the received events data to conform to a single standard. In some embodiments, the events management server may anonymize the events data. The events management server may partition the events data. In some embodiments, the events data may be partitioned using a pre-determined time threshold, such as ten minutes. The events data may by partitioned and stored as data streams. The partitioned data may be transmitted to a primary events datastore. In some embodiments, an events publisher server may be in communication with the primary events datastore as well as an events datastore. In some embodiments, the events publisher server may be responsible for publishing events from the primary events datastore to the events datastore. The events publisher server may receive notifications from the primary events datastore whenever new data has been added. In some embodiments, the events publisher server may poll the primary events datastore at periodic intervals (e.g., every ten minutes) to identify any new data that may have been added. The events datastore may be used as a fast key-value store of event data available to a bidder server to use in generating bids in response to bid requests. The events publisher server may be responsible for loading the required events data for the bidder server into the events datastore. The events publisher server may poll the events datastore for missing data for intervals of time and may fill the missing data for missing intervals of time with available from the primary events datastore. In some embodiments, the events publisher server may poll the events datastore in predetermined increments of time, such as ten-minute increments. The data in the events datastore may be made available to the bidder server as well as a model building server to be used in the generation of bids that include multiple items that may be depicted in an online advertisement.

In some embodiments, the bidder server may select groups of items rather than individually evaluating each item. For example, items may be grouped based on different attributes, such as type of item, producer of item, color of item, or the like. The bidder server may use the retargeting model to rank all the collections or groups of items. The model building server may use machine learning techniques applied to obtained user data to train models to select items to be grouped together. Additionally, the model building server may generate rules based on the trained data to be used to select items for a group. Examples of such rules may include indicating a maximum price difference among the items, an ideal number of items for a type of product, or the like.

The terms "delivery of an advertisement," "delivery of an advertisement impression," "presentment of an advertisement impression," "serving an ad impression," or any other similar term may be used interchangeably throughout this disclosure.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and System Architecture

FIG. 1 depicts an illustrative data flow 100 between various components of an illustrative system architecture for bid time data service for retargeting events for online advertising campaigns in accordance with one or more embodiments of the disclosure.

One or more illustrative user devices 104 are illustratively depicted in FIG. 1. The user device(s) 104 may include any suitable device capable of receiving and rendering webpages and launching applications, where the webpages and applications may display one or more advertisements to be viewed by a user. The user device(s) 104 may include any suitable processor-driven computing device including, but not limited to, a smartphone or other cellular device, a tablet device, an electronic reader device, a desktop computing device, a laptop computing device, a gaming console, a multimedia content streaming device, a set-top box, wearable computing device, and so forth. In certain example embodiments, the user device(s) 104 may include a television such as, for example, a smart TV, an Internet Protocol television (IPTV), or the like. For ease of explanation, the user device(s) 104 may be described herein in the singular; however, it should be appreciated that multiple user device(s) 104 may be provided.

In various example embodiments, a user application (e.g., a browser application) executing on a user device 104 may transmit events (e.g., shopping events, conversion events, etc.) to one or more server(s) (not pictured), which may store the events in one or more source datastore(s) 106. In some embodiments, the user device(s) 104 may transmit one or more event(s) to one or more event management server(s) 108.

An event management server 108 may receive the event data (e.g., raw event data) from the multiple user device(s) 104 and/or one or more source datastore(s) 106 and may facilitate processing the event data. The event management server 108 may transmit all or a portion of the processed event data to one or more primary events datastore(s) 110.

In some embodiments, the bidder server 116 may receive and respond to bid requests from one or more ad exchange server(s) 126.

The bidder server 116 may obtain events from the events datastore 114 to generate a bid in response to a bid request from the ad exchange server(s) 126. In some embodiments, the events may include past impressions and state information associated with a session of a user. The events may be used to identify multiple items with the highest predicted value to retarget. The bidder server 116 may transmit information associated with active or completed bids to a bid datastore 118.

The bidder server 116 may receive a retargeting model generated by the model building server 124. The model building server 124 may generate a retargeting model using information obtained from the events datastore 114, the bid datastore 118, and/or an attribution system server 122. The retargeting model may be used to generate a value associated with an item identified from an event, which may indicate a potential revenue generation amount associated with the item, such as a product or service.

The attribution system server 122 may obtain information from different sources, such as the events datastore, conversion events datastore 122, or other sources (e.g., retail website datastore). The attribution system server 122 may process the obtained information (e.g., joining different set of data using identified attributes) and transmitting the processed information to the model building server 124.

The model building server 124 may use the information obtained from the attribution system server 122 as well as other sources and may generate a new retargeting model or modify or update an existing retargeting model. The model building server 124 may transmit or otherwise make available the retargeting model to the bidder server 116.

The bidder server 116 may use the retargeting model obtained from the model building server 124 to generate values associated with the identified products from the identified events. The bidder server 116 may rank the events using the generated values and select multiple items using one or more rules. The bidder server 116 may then generate a bid using the values associated with the selected multiple items and may transmit the bid to the ad exchange server 126 in response to the bid request.

The events datastore 114 may be a fast key-value store of event data that may be used by the bidder server 116 to response to bid requests. The events datastore 114 may be keyed by a session identifier and a key prefix for each data set. The stored values may be sorted sets of strings representing each event, ordered by the timestamp of the event. The use of sorted sets allows the events datastore 114 to be accessed by either time or index and writes to be idempotent.

The events datastore 114 may be populated by one or more events publisher server(s) 112. Events publisher servers may be responsible for loading the required input data for the bidder server 116 to use to the events datastore 114. In some embodiments, the events publisher server(s) 112 may generate data set keys (e.g., events data set key, impressions data set key, and/or session data set keys) in addition to the events data. Additionally, an index may be generated and maintained for the events datastore 114, listing the partitions and events stored in the events datastore 114. The index may be used to identify data missing for intervals of time.

In some embodiments, the events publisher server 112 may poll or otherwise communicate with the events datastore 114 to identify missing data from intervals of time (e.g., data associated with a specific range of time). If the events publisher server 112 identifies missing data for a particular interval of time, the events publisher server may obtain the missing data for the interval of time from the primary events datastore 110. By having the events publisher server 112 supplement the events datastore 114 with data from the primary events datastore 110, the bidder server 116 may have sufficient data to generate bids in response to bid requests for online advertising.

Figure 2:
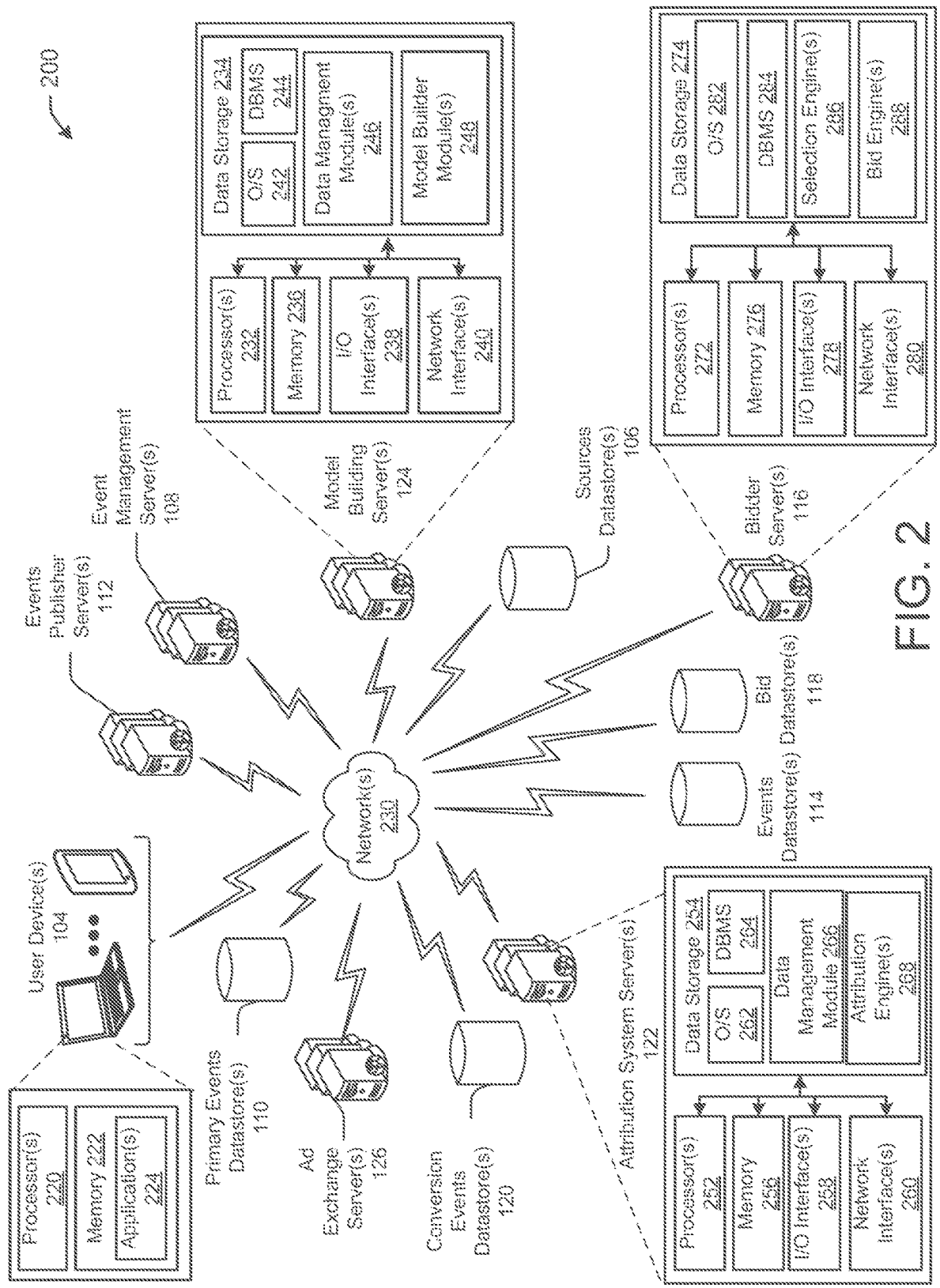
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture 200 depicted in FIG. 1 in accordance with one or more embodiments of the disclosure. FIG. 2 includes user device(s) 104, sources datastore(s) 106, event management server(s) 108, primary events datastore(s) 110, events publisher server(s) 112, events datastore(s) 114, bidder server(s) 116, bid datastore(s) 118, conversion events datastore(s) 120, attribution system server(s) 122, model building server(s) 124, and ad exchange server(s) 126. Each component may be connected via network 230.

Any of the user device(s) 104, sources datastore(s) 106, event management server(s) 108, primary events datastore(s) 110, events publisher server(s) 112, events datastore(s) 114, bidder server(s) 116, bid datastore(s) 118, conversion events datastore(s) 120, attribution system server(s) 122, model building server(s) 124, and/or ad exchange server(s) 126 may be configured to communicate with each other and any other component of the architecture 200 via one or more network(s) 230.

The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Referring now to the user device 104, the user device 104 may include one or more processor(s) 220 and one or more memory device(s) 222 with a user application 224 stored thereon. The user device 104 may also include various additional components, such as one or more input device(s), I/O interface(s), radio/antennas, network interface(s), and other components. The user device 104 may also include an operating system configured to provide an interface between software and hardware resources of the user device 104, and/or database management systems configured to support functionality of the memory 222. The user device 104 may include system busses that functionally couple various components of the user device 104. In other embodiments, the user device 104 may include additional or fewer components.

The memory 222 may include one or more program modules, applications, or the like, such as the user application 224. One or more user applications 224 may be loaded into the memory 222. The user application(s) 224 may be any application(s) capable of facilitating the display of or otherwise presenting advertisement impressions to the user 102. The user application(s) 224 may include, but are not limited to, a web-based browser application, a dedicated software application (e.g., a smart phone application, a tablet application, etc.), a mobile browser application, and so forth. The user application 224 may be configured to render web pages on a respective user device 104. Any data may be loaded into the memory 222 for use by the processor(s) 220 in executing computer-executable code. The user device 104 may be configured to access, store, and/or retrieve data in or from one or more datastore(s). The user device 104 may also include communications connection(s) that allow the user device 104 to communicate with datastores, other computing devices or servers, user terminals, and/or other devices via the network(s) 230.

The user device 104 may be any suitable user device including, but not limited to, a mobile device, such as a smartphone, tablet, e-reader, or the like; a desktop computer; a laptop computer, a game console, a personal media player, a wearable computer device, and so forth. The user device 104 may be configured to present or serve ad impressions to users 102. The user device 104 may be configured to operate in various operational modes and may be configured to present electronic content and ad impressions.

The sources datastore(s) 106 may receive events data from different sources, such as user device(s) 104, source server(s), and/or other datastore(s).

Now referring to the model building server(s) 124, the model building server(s) 124 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the model building server(s) 124, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The model building server(s) 124 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The model building server(s) 124 may further include network interface(s) 240 that facilitate communication between the model building server(s) 124 and other devices of the illustrative system architecture 200 (e.g., user device(s) 104, primary events datastore(s) 110, etc.) or application software via the network(s) 230. The model building server(s) 124 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 234, various program modules, applications, or the like may be stored therein that may comprise computer-executable instructions that when executed by the processor(s) 232, cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the model building server(s) 124 and the hardware resources of the model building server(s) 124. More specifically, the O/S 242 may include a set of computer-executable instructions for managing the hardware resources of the model building server(s) 124 and for providing common services to other application programs (e.g., managing memory allocation among various application programs). The O/S 242 may include any operating system now known or which may be developed in the future, including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., ad attribution datastore 112). The DBMS 244 may use any of a variety of database models (e.g., relational model, object model, etc.) and may support any of a variety of query languages. In some embodiments, the data storage 234 may use an online file storage web service, such as Simple Storage Service (S3). The data storage 234 may additionally include various other program modules that may include computer-executable instructions for supporting a variety of associated functionality. For example, the data storage 234 may include one or more data management modules 246 and/or one or more model builder module(s) 248.

The data management module(s) 246 may include computer-executable instructions that in response to execution by the processor(s) 232 cause operations to be performed, including receiving or otherwise obtaining events data from one or more sources, such as the ad attribution server(s) 122, bid datastore 118, and the like. The data management module 246 may transmit the data obtained from one or more sources to the model building module(s) 248 for processing. The data management module 246 may receive a model generated by the model builder module(s) 248 and may transmit the model to the bidder server 116.

The model builder module 248 may include computer-executable instructions that upon execution by the processor(s) 232, configures the processor(s) 232 to obtain or otherwise receive data from the data management module 246. The model builder module 248 may generate a new model to use for retargeting online advertisement campaign recommendations for multiple items or may modify or update an existing model. The model builder module 248 may utilize machine learning techniques to use the obtained information to walk through events to refine models and techniques for generating the models. The model builder module 248 may then transmit the model to the data management module 248. In some embodiments, the model builder module 248 may generate or modify retargeting models at periodic intervals (e.g., hourly, daily, weekly, etc.). The model builder module 248 may generate or modify retargeting models in response to identifying events (e.g., introduction of a new model of a product, etc.). The model builder module 248 may generate or modify retargeting models in response to a process manually initiated by an administrator of the system.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations, the various functions provided by the modules may be merged, separated, and so forth. Furthermore, the modules may intercommunicate or otherwise interact with one another, such that the conditions of one affect the operation of another.

The attribution system server(s) 122 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the attribution system server(s) 122, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The attribution system server(s) 122 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The attribution system server(s) 122 may further include network interface(s) 260 that facilitate communication between the attribution system server(s) 122 and other devices of the illustrative system architecture 200 (e.g., bidder server 116, bid datastore(s) 118, etc.) or application software via the network(s) 230. The attribution system server(s) 122 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the attribution system server(s) 122 and the hardware resources of the attribution system server(s) 122. More specifically, the O/S 262 may include a set of computer-executable instructions for managing the hardware resources of the attribution system server(s) 122 and for providing common services to other application programs (e.g., managing memory allocation among various application programs). The O/S 262 may include any operating system now known or which may be developed in the future, including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more data management module(s) 266 and/or one or more attribution engine(s) 268.

The data management module 266 may include computer-executable instructions, code, or the like, that, responsive to execution by the processor(s) 252, may cause the data management module 266 to obtain data from different sources, such a conversion events datastore 120, a bid datastore 118, a retail website datastore or data warehouse, or the like.

The attribution engine 268 may include computer-executable instructions, code, or the like, that, responsive to execution by the processor(s) 252, may cause the attribution engine 268 to process the data obtained from the different sources by the data management module 266. In some embodiments, the processing the obtained data may include joining different data sets based on an identified attribute or otherwise integrating the disparate data sets into a more data set consumable by the bidder server 116 or the model building server 124.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations, the various functions provided by the modules may be merged, separated, and so forth. Furthermore, the modules may intercommunicate or otherwise interact with one another, such that the conditions of one affect the operation of another.

The bidder server(s) 116 may include one or more processors (processor(s)) 272 and one or more memories 276 (referred to herein generically as memory 276). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from the data storage 274 and loaded into the memory 276 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into the memory 276 as needed for execution. Depending on the configuration and implementation of the bidder server(s) 116, the memory 276 may be volatile memory (memory that is not configured to retain stored information when not supplied with power), such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The bidder server(s) 116 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The bidder server(s) 116 may further include network interface(s) 280 that facilitate communication between the bidder server(s) 116 and other devices of the illustrative system architecture 200 (e.g., user device(s) 104, events datastore 114, etc.) or application software via the network(s) 230. The bidder server(s) 116 may additionally include one or more input/output (I/O) interfaces 278 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 274, various program modules, applications, or the like may be stored therein that may comprise computer-executable instructions that when executed by the processor(s) 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the bidder server(s) 116 and the hardware resources of the bidder server(s) 116. More specifically, the O/S 282 may include a set of computer-executable instructions for managing the hardware resources of the bidder server(s) 116 and for providing common services to other application programs (e.g., managing memory allocation among various application programs). The O/S 282 may include any operating system now known or which may be developed in the future, including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores. The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more selection engine(s) 286 and/or bid engine(s) 288.

The selection engine 286 may include computer-executable instructions, code, or the like, that, responsive to execution by the processor(s) 272, may cause the selection engine 286 to identify events and generate values for each of the events using a model received from a model building server 124. The selection engine 286 may identify one or more events to be used in the generation of a bid in response to a bid request received from an ad exchange server 126.

The bidding engine 288 may include computer-executable instructions, code, or the like, that, responsive to execution by the processor(s) 272, may cause the bidding engine 288 to receive and analyze one or more received bid requests. The bidding engine 288 may receive a selection of one or more items from the selection engine 286. The bidding engine 288 may generate a bid in response to the request received from the ad exchange server 126. The bidding engine 288 may transmit the bid in response to the bid request and if the bid wins the auction, may facilitate to the generation of the creative to be displayed in the advertisement slot associated with the winning bid using the one or more events of the bid.

Within the data storage 274, one or more modules may be stored. As used herein, the term module may refer to a functional collection of instructions that may be executed by the one or more processor(s) 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Data Flow

Figure 3:
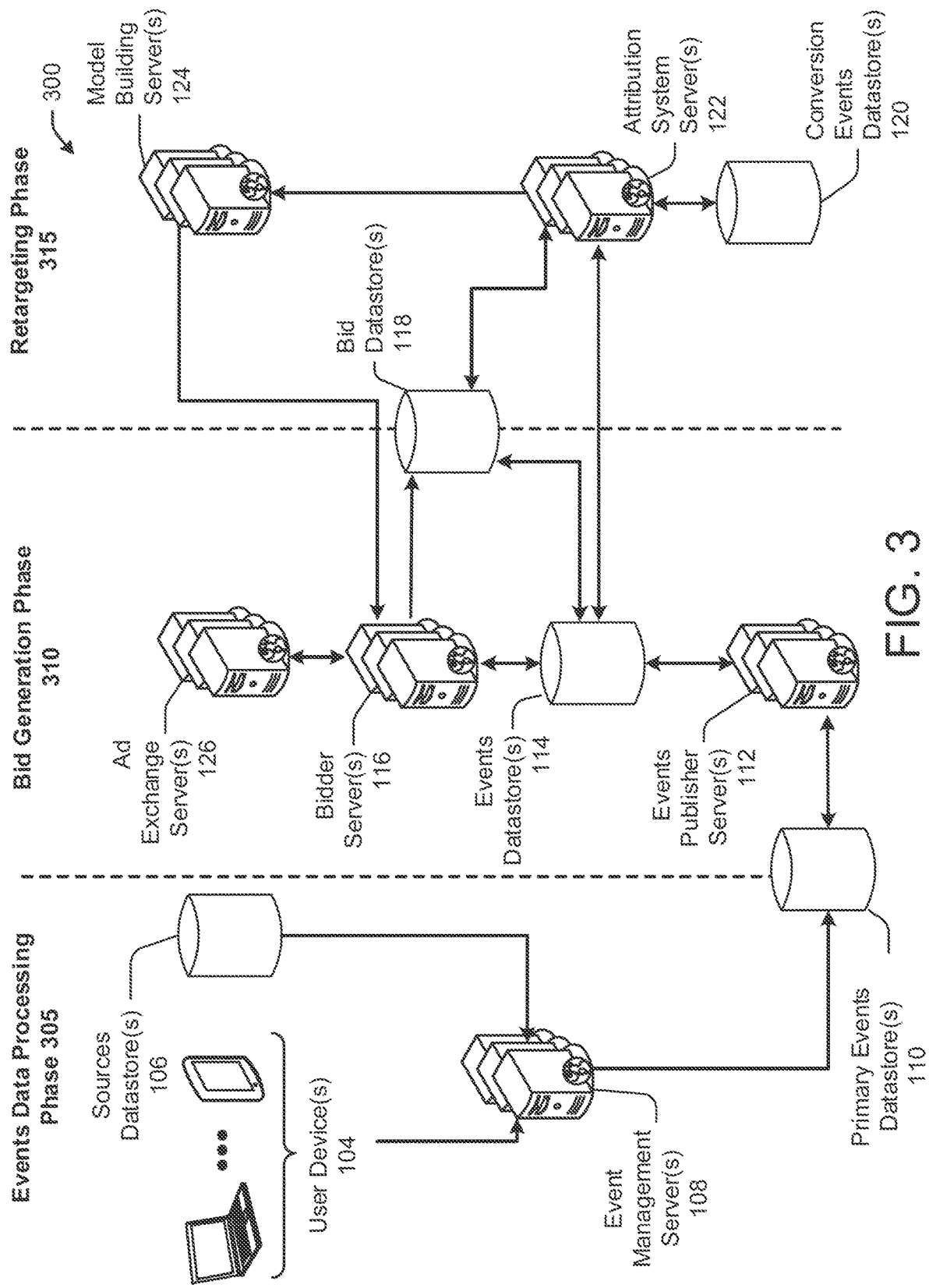
FIG. 3 is an example data flow of a system for bid time data service for retargeting events for online advertising campaigns in accordance with one or more embodiments of the disclosure.

FIG. 3 is an example data flow of a system 300 for bid time data service for retargeting events for online advertising campaigns in accordance with one or more embodiments of the disclosure.

In some embodiments, the data flow 300 may be divided into three phases, the events data processing phase 305, the bid generation phase 310, and the retargeting phase 315. In some embodiments, the three phases may occur in parallel and/or asynchronously.

The events data processing phase 305 may include obtaining event data from different sources. Event data may be generated by different devices and servers, such as laptops, smartphones, tablets, web servers, or the like. Event data may include conversion event and/or ad traffic data, which may be generated and stored in different datastores, such as sources datastore(s) 106. In some embodiments, the event data may be obtained by the events management server 108. The events data may then be processed by the events management sever 108. For example, event management server 108 may process the events data, which may be in the form of data logs. The data logs may be normalized and then anonymized by the events management server 108. In some embodiments, the events management server 108 may use the normalized logs and may partition to the events data using a configurable time threshold. For example, the events management server 108 may partition the normalized events data into partitions of ten minutes. The partitions may include events that occurred within the specified ten-minute range. The partitions may be transmitted to one or more primary events datastores 110 by the events management server 108.

In the bid generation phase 310, the bidder server 116 may receive bid requests from different servers, such as an ad exchange server 126. The bidder server 116 may identify an advertisement slot from a bid request and may generate or obtain data to use in the generation of a bid in response to the bid request. The bidder server 116 may identify one or more data of one or more time intervals to be retrieved from the events datastore 114 to be used in the bid generation by the bidder server 116.

The bidder server 116 may request data for one or more time intervals from the events datastore 114. Each time interval may include a maximum number of events for a given time range (e.g., ten minutes). For example, each time interval may include up to 250 events that may be associated with a user for an identified ten-minute interval.

The bidder server 116 may request data for one or more time intervals from the events datastore 114. Each time interval may include a maximum number of events for a given time range (e.g., ten minutes). For example, each time interval may include up to 250 events that may be associated with a user for an identified ten-minute interval.

In the retargeting phase 315, the bidder server 116 may identify events from the events datastore 114 that were previously viewed by the consumer. From the events, items or services may be identified. The bidder server 116 may receive a retargeting model from the model building server 124 offline or asynchronously from real-time auctions of advertisement slots to avoid taxing the real-time bidding by the bidder server 116. The attribution system server 122 may obtain information from different sources, such as the events datastore 114, conversion events datastore 120, or other sources (e.g., retail website datastore or data warehouse). The attribution system server 122 may process the obtained data and provide the processed data to the model building server 124. The model building server 124 may use the information received from the attribution system server 122 to generate new retargeting models and/or update or modify existing machine-learned retargeting models that may be used by the bidder server 116 to retarget events for online advertisement campaigns for multiple items. The events may then be ranked using the generated values and two more items may be selected. In some embodiments, the items may be selected using one or more rules (e.g., minimum threshold value associated with the events or number of events to select). The bidder server 116 may then generate a bid in response to the bid request received from the ad exchange server 126 using meta data associated with the selected one or more events (e.g., items).

In the retargeting phase 315, the bidder server 116 may identify events from the events datastore 114 that were previously viewed by the consumer. From the events, items or services may be identified. The bidder server 116 may receive a retargeting model from the model building server 124 offline or asynchronously from real-time auctions of advertisement slots to avoid taxing the real-time bidding by the bidder server 116. The attribution system server 122 may obtain information from different sources, such as the events datastore 114, conversion events datastore 120, or other sources (e.g., retail website datastore or data warehouse). The attribution system server 122 may process the obtained data and provide the processed data to the model building server 124. The model building server 124 may use the information received from the attribution system server 122 to generate new retargeting models and/or update or modify existing machine-learned retargeting models that may be used by the bidder server 116 to retarget events for online advertisement campaigns for multiple items. The events may then be ranked using the generated values and two more items may be selected. In some embodiments, the items may be selected using one or more rules (e.g., minimum threshold value associated with the events or number of events to select). The bidder server 116 may then generate a bid in response to the bid request received from the ad exchange server 126 using meta data associated with the selected one or more events (e.g., items).

Illustrative Processes

Figure 4:
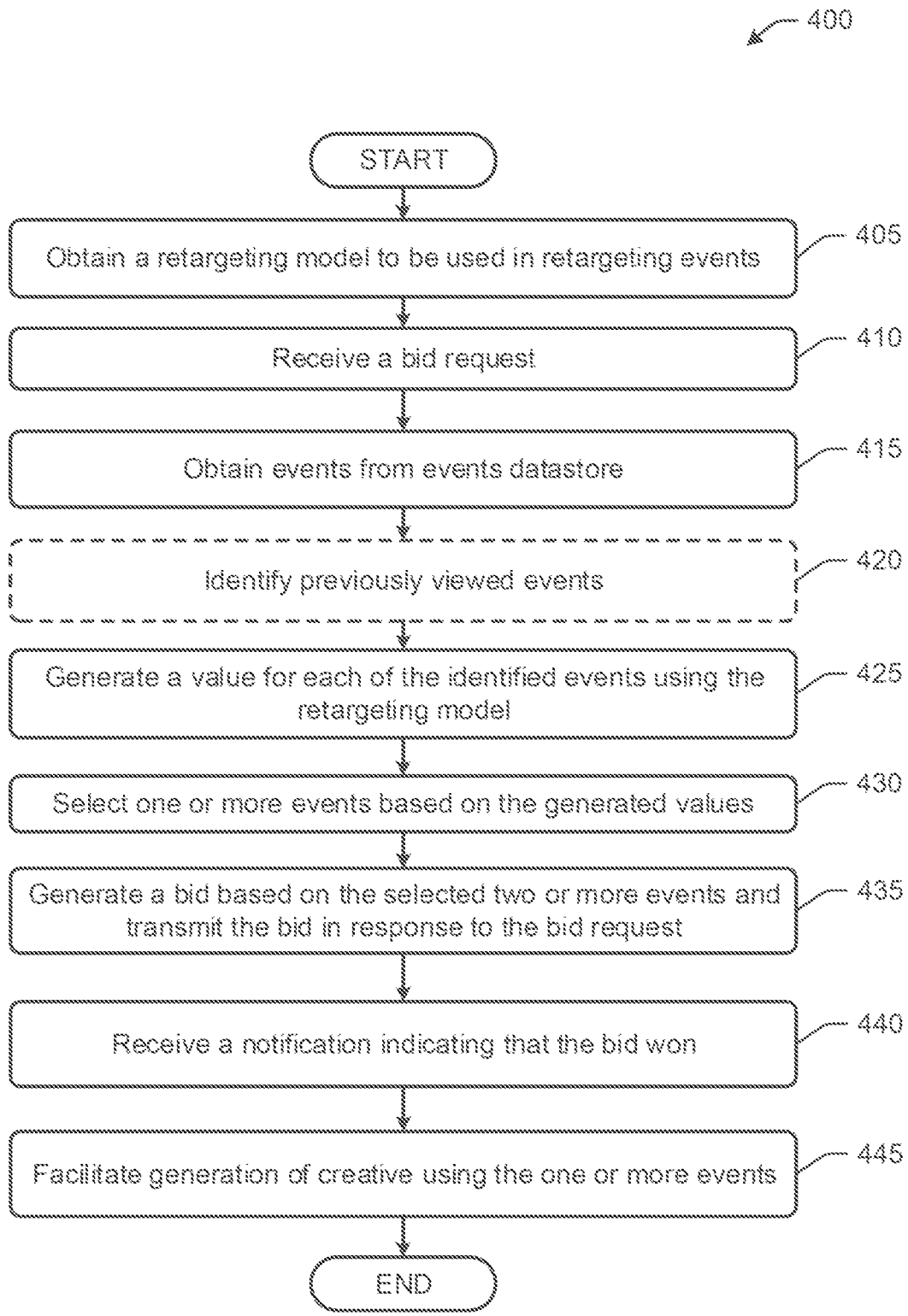
FIG. 4 is a process flow diagram of an illustrative method for bid time data service for retargeting events for online advertising campaigns in accordance with one or more embodiments of the disclosure.

FIG. 4 is a process flow diagram of an illustrative method 400 for bid time data service for retargeting events for online advertising campaigns in accordance with one or more embodiments of the disclosure. At block 405, the bidding server 116 may obtain a retargeting model to be used in retargeting events for online advertisement campaign for multiple events. In some embodiments, the retargeting model may have been previously generated and stored to a datastore and the bidding server 116 may obtain a retargeting model from the datastore. In some embodiments, the model building server 124 may generate a new retargeting model or update/modify an existing retargeting model using information obtained from the attribution system server 122. In some embodiments, the selection engine 286 of the bidding server 116 may obtain and/or receive one or more retargeting models from the model building server 124 and/or one or more datastores. In some embodiments, the selection engine 286 may obtain a new retargeting model or updated retargeting model at periodic intervals configured by an administrator or from the model building server 124. The bidding server 116 may obtain the retargeting model(s) asynchronously or offline to avoid taxing the system during real-time bidding for advertisement slots.

At block 410, the bidding server 116 may receive a bid request. In some embodiments, the bid engine 288 of the bidding server 116 may receive one or more bid requests on advertisement slots from an ad exchange server 126. The ad exchange server 126 may be part of the ecosystem of the retargeting system 200 or may be a third-party ad exchange server. The bid request may include information associated with the size and placement of the advertisement slot and/or information associated with the website or application that will display the advertisement.

At block 415, the bidding server 116 may obtain events from an events datastore. In some embodiments, the events may include snapshot data that is indicative of a state of the customer (e.g., type of account, type of payment method, subscription customer, etc.). The events datastore 114 may include data associated with previous bids from the bid datastore 118.

At block 420, the bidder server 116 may optionally identify previously viewed events. In some embodiments, the events may be associated with a user session or session identifier. In some embodiments, the events may be associated with a user or user identifier. In some embodiments, the events may be identified based on a timestamp associated with the event (e.g., all events viewed in last hour). The events may be identified using another attribute so long as the events (e.g., items associated with the events) have been previously displayed to increase the likelihood of a conversion event based on previous interest in the event.

At block 425, the bidder server 115 may generate a value for each of the identified events using the retargeting model. In some embodiments, the selection engine 286 may apply the retargeting model to the one or more identified events. In some embodiments, the retargeting model may accept different types of data as input. Examples of the input data may include an events index in the user activity history, the number of times the user viewed the event, a price associated with an item of an event, the number of prior impressions of the event, the conversion rate of the event for the website on which the advertisement will be displayed, and/or how recently the event was viewed by the user. The retargeting model may generate a numeric value for each of the identified events, where the value may be indicative of potential revenue generation amount associated with an event. In some embodiments, the value may be the total expected revenue from the event, total expected revenue multiplied by an allowable value (e.g., allowable may be a fraction which can vary from event to event and chosen to reflect the strategic value or profit margin of the event, total expected contribution profit, expected downstream impact or any other value that may reflect an objection which addresses business needs. In some retargeting models, the price of an item of an event may be removed before determining a value to avoid the user being "upsold" or selecting items because they are more expensive. In some embodiments, the retargeting model may be applied to a plurality of events and the events may be ranked based on their respective values generated by the retargeting model.

At block 430, the bidder server 116 may select one or more events based on the generated values. In some embodiments, the selection engine 286 may rank the events based on the generated values. The selection engine 286 may select one or more events based on a rule. In some embodiments, a rule may indicate a minimum threshold value. If any of the ranked events is equal to or greater than the minimum threshold value, the selection engine 286 may select the events for inclusion in the bid. In some embodiments, the rule may indicate a number of events to select and the selection engine 286 may use specified criteria (e.g., selecting events with highest values, selecting events with lowest values, etc.) to select the specified number of events. In some embodiments, the rules may be dynamically adjusted based on the bid request. For example, the bid request may specify the size of the advertisement slot to be displayed on a mobile application of a mobile device. As mobile devices tend to be small, the threshold or rule may indicate that only a single event should be selected. However, if the bid request indicates the advertisement slot is a larger display or device, such as a television display, then a great number of items may be selected.

At block 435, the bidder server 116 may generate and transmit a bid in response to the request based on the selection of the one or more events. In some embodiments, the values associated with the selected events may be used to generate the bid. In some embodiments, the meta data associated with the one or more events may be used to generate the bid. At block 440, the bidder server 116 may receive notification indicating that the bid won the auction. At block 445, the bidder server 116 may facilitate generation of creative using metadata or other data associated with the one or more events (e.g., items identified from the events) in response to receiving the notification.

In some embodiments, the creative may be generated using the metadata associated with the one or more events before generation of the bid. The creative may be included in the bid.

Figure 5:
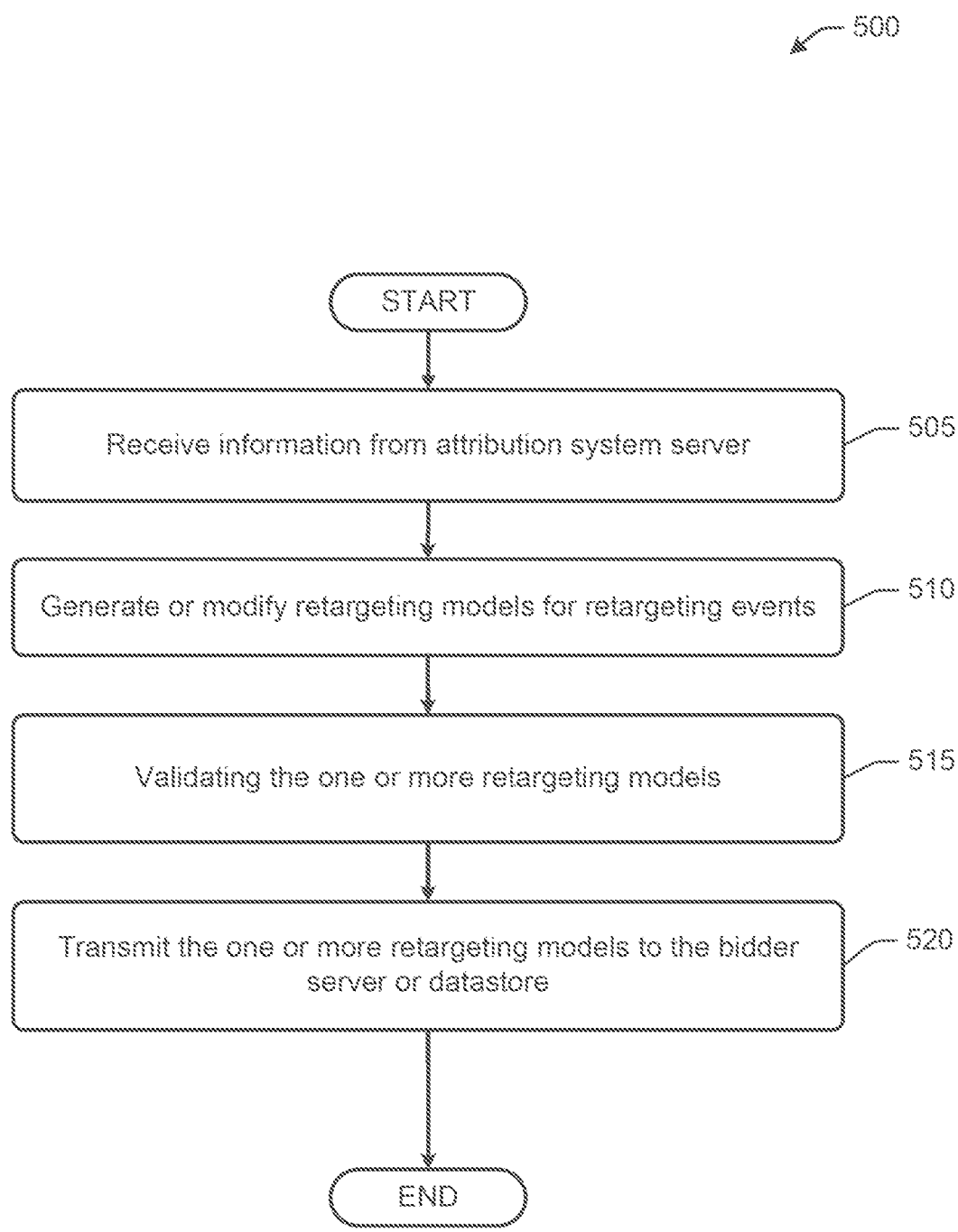
FIG. 5 is a process flow diagram of an illustrative method for model generation to be used for bid time data service for retargeting events for online advertising campaigns in accordance with one or more embodiments of the disclosure.

FIG. 5 is a process flow diagram of an illustrative method 500 for model generation to be used for bid time data service for retargeting events for online advertising campaigns in accordance with one or more embodiments of the disclosure. At block 505, a model building server 124 may receive information from an attribution system server 122. In some embodiments, the data management module 246 may receive data from the attribution system server 122 at periodic intervals, which may be configured by an administrator. In some embodiments, the data management module 246 may obtain data from the attribution system server 122 as information is processed by the attribution system server 122. In some embodiments, the attribution system server 122 may batch process information received from a conversion events datastore 120, an events datastore 114, and or other source. The attribution system server 122 may use logs the bid datastore 118 and data obtained from a retail website database, which may include information associated with purchases and/or consumers, and any other type of information obtained from the system 100 to process the information. In some embodiments, the attribution engine 268 of the attribution system server 122 may identify one or more attributes from the information from the different sources to use to join the information. The processed information may then be transmitted to the model building server 124.

At block 510, the model building server 124 may generate or modify one or more retargeting models for retargeting events for online advertisement campaigns for multiple events. In some embodiments, the information obtained from the bid datastore 118 and/or the attribution system server 122 may be used to train one or more retargeting models to be used for retargeting events for online advertisement campaigns. In some embodiments, the model builder module 248 may generate a new retargeting model using the received information. In some embodiments, the model builder module 248 may update or modify an existing retargeting model using the received information. In some embodiments, a rule may be used to identify retargeting models that should be discarded (e.g., retargeting models generated over a year ago). In response to discarding a retargeting model, the model builder module 248 may generate a new retargeting model using the received information. The retargeting models generated by the model builder module 248 may be used by a server, such as the bidder server 116 to generate values associated with events. For example, information, such as consumer demographics, historic bid information, historic purchase information, or the like, may be inputted into the model. The retargeting model may process the inputted information and generate a numerical value indicating a potential revenue generation amount associated with an event (e.g., item).

At block 515, the model building server 123 may validate the one or more retargeting models generated or modified at block 510. In some embodiments, the model builder module 248 may compare the one or more retargeting models to a baseline retargeting model or a previous retargeting model and may determine a value indicative of a level of deviation or difference. In some embodiments, the model builder module 248 may determine if the value exceeds a given threshold (e.g., 50% difference). The model builder module 248 may determine that if the value exceeds the given threshold, the retargeting model is not validated and the retargeting model may be re-generated or modified.

In some embodiments, the model builder module 248 may apply the one more retargeting models and identify if the retargeting model exceeds a predetermined cut-off value. If the retargeting model exceeds a predetermined cut off value, the model builder module 248 may regenerate or modify the retargeting model.

In some embodiments, the model builder module 248 may use one or more techniques to validate the one or more retargeting models.

At block 520, the model building server 124 may transmit the validated one or more retargeting models to one or more bidder servers 116 to use for retargeting events for online advertisement campaigns or to a datastore which may be accessed by one or more bidder servers 116. In some embodiments, the processing of information, generation or modification of a retargeting model, and transmission of the retargeting model to a server may be completed offline or asynchronously to avoid taxing the system while it generates real-time bids using previously transmitted retargeting models.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
   receiving, by at least one processor, data from one or more sources, the data associated with attributed events, a first event of the attributed events being associated with an online advertisement campaign;
   generating, by the at least one processor, and based at least in part on the data, a retargeting model, wherein the retargeting model generates a first value associated with the first event, the first value indicating a potential revenue associated with the first event;
   generating, by the at least one processor, a second value associated with the retargeting model relative to a baseline retargeting model;
   determining, by the at least one processor, and based at least in part on the second value, that the retargeting model is validated;
   receiving, by the at least one processor, a bid request for a real-time auction of an online advertisement slot; and
   determining, by the at least one processor, using the validated retargeting model, a second event for bid determination.

2. The method of claim 1, further comprising:
   training, based at least in part on the data, the retargeting model to select the second event for retargeting.

3. The method of claim 1, wherein the data is first data, and the online advertisement campaign is a first online advertisement campaign, the method further comprising:
   receiving second data associated with a second online advertisement campaign, wherein the second data is different than the first data; and
   modifying the validated retargeting model based at least in part on the second data.

4. The method of claim 1, wherein the retargeting model is a first retargeting model, the method further comprising:
   determining that a second retargeting model was generated more than a period of time ago; and
   discarding the second retargeting model.

5. The method of claim 1, wherein the second value is indicative of a deviation of the retargeting model from the baseline retargeting model, the method further comprising:
   determining that the second value does not exceed a threshold,
   wherein determining that the retargeting model is validated is based at least in part on determining that the second value does not exceed the threshold.

6. The method of claim 5, wherein the retargeting model is a first retargeting model, the method further comprising:
   generating, based at least in part on the data, a second retargeting model;
   generating, a third value associated with the second retargeting model;
   determining that the third value exceeds the threshold; and
   determining that the second retargeting model is not validated.

7. The method of claim 1, wherein the data comprises first data from a bid datastore and second data from an attribution system, wherein the second data from the attribution system is generated from conversion data and events data.

8. The method of claim 1, further comprising:
   generating, based at least in part on the validated retargeting model, a third value for the second event associated with the online advertisement slot, and wherein determining the second event is based at least in part on the third value;
   determining a bid associated with the second event; and
   transmitting the bid.

9. The method of claim 1, wherein determining the retargeting model is validated is performed offline or asynchronously from the real-time auction.

10. A system comprising:
    at least one memory storing computer-executable instructions; and
    at least one processor, wherein the at least one processor is configured to access the at least one memory and to execute the computer-executable instructions to:
       receive data from one or more sources, the data associated with attributed events, a first event of the attributed events being associated with an online advertisement campaign;
       generate, based at least in part on the data, a retargeting model, a retargeting model, wherein the retargeting model generates a first value associated with the first event, the first value indicating a potential revenue associated with the first event;
       generate a second value associated with the retargeting model relative to a baseline retargeting model;
       determine, based at least in part on the second value, that the retargeting model is validated;
       receive a bid request for a real-time auction of an online advertisement slot; and determine, using the validated retargeting model, a second event for bid determination.

11. The system of claim 10, wherein the at least one processor is further configured to execute the computer-executable instructions to:
train, based at least in part on the data, the retargeting model to select the second event for retargeting.

12. The system of claim 10, wherein the data is first data, and the online advertisement campaign is a first online advertisement campaign, wherein the at least one processor is further configured to execute the computer-executable instructions to:
receive second data associated with a second online advertisement campaign, wherein the second data is different than the first data; and
modify the validated retargeting model based at least in part on the second data.

13. The system of claim 10, wherein the retargeting model is a first retargeting model, and wherein the at least one processor is further configured to execute the computer-executable instructions to:
determine that a second retargeting model was generated over a period of time; and
discard the second retargeting model.

14. The system of claim 10, wherein the second value is indicative of a deviation of the retargeting model from the baseline retargeting model, and wherein the at least one processor is further configured to execute the computer-executable instructions to:
determine that the second value does not exceed a threshold,
wherein determining that the retargeting model is validated is based at least in part on determining that the second value does not exceed the threshold.

15. The system of claim 14, wherein the retargeting model is a first retargeting model, and wherein the at least one processor is further configured to execute the computer-executable instructions to:
generate, based at least in part on the data, a second retargeting model;
generate, a third value associated with the second retargeting model;
determine that the third value exceeds the threshold; and
determine that the second retargeting model is not validated.

16. The system of claim 10, wherein the data comprises first data from a bid datastore and second data from an attribution system, wherein the second data from the attribution system is generated from conversion data and events data.

17. The system of claim 10, wherein the at least one processor is further configured to execute the computer-executable instructions to:
generate, based at least in part on the validated retargeting model, a third value for the second event associated with the online advertisement slot, and wherein determining the second event is based at least in part on the third value;
determine a bid associated with the second event; and
transmit the bid.

18. The system of claim 17, wherein determining the retargeting model is validated is performed offline or asynchronously from the real-time auction.

19. One or more non-transitory computer-readable medium comprising computer-executable instructions that, when executed by at least one processor, execute a method comprising:
receiving, by at least one processor, data from one or more sources, the data associated with attributed events, a first event of the attributed events being associated with an online advertisement campaign;
generating, by the at least one processor, and based at least in part on the data, a retargeting model, wherein the retargeting model generates a first value associated with the first event, the first value indicating a potential revenue associated with the first event;
generating, by the at least one processor, a second value associated with the retargeting model relative to a baseline retargeting model;
determining, by the at least one processor, and based at least in part on the second value, that the retargeting model is validated;
receiving, by the at least one processor, a bid request for a real-time auction of an online advertisement slot; and
determining, by the at least one processor, and using the validated retargeting model, a second event for bid determination.

20. The one or more non-transitory computer-readable medium of claim 19, wherein the method further comprises:
training, based at least in part on the data, the retargeting model to select the second event for retargeting.

* * * * *